United States Patent Office 3,562,264
Patented Feb. 9, 1971

3,562,264
TRANS-DIHYDROXY-BIS-HYDROXYCARBONYL-ETHYLENE SALTS
Yoichi Sawa, Suita, Hajime Fujimura, Kyoto, Toru Masuda, Nishinomiya, and Yutaka Yamakawa, Kyoto, Japan, assignors to Takeda Chemical Industries, Ltd., Osaka, Japan
No Drawing. Filed Feb. 13, 1968, Ser. No. 705,004
Claims priority, application Japan, Feb. 13, 1967, 42/9,132
Int. Cl. C07d 51/64, 87/22
U.S. Cl. 260—246     3 Claims

ABSTRACT OF THE DISCLOSURE

The morpholine and piperazine salts of trans-dihydroxy-bis-hydroxycarbonylethylene (dihydroxy fumaric acid) are useful as antipyretic, analgesic and anti-inflammatory agents of low toxicity. Unlike acetyl salicylic acid, they cause no gastroenteric disorders; unlike dihydroxy fumaric acid they are stable to elevated temperature and humidity.

---

This invention relates to novel trans-dihydroxy-bis-hydroxycarbonylethylene salts which are therapeutically useful, for example, as antipyretic, analgesic and anti-inflammatory agents. More concretely, the present invention relates to morpholine or piperazine salt of trans-dihydroxy-bis-hydroxy-carbonylethylene.

Acetyl salicylic acid has been used, as an antipyretic, analgesic and anti-inflammatory agent for many years. However, it has relatively high toxicity, and often causes various gastroenteric disorders. Therefore, there has been an anxious desire for low toxic, and effective antipyretic, analgesic and anti-inflammatory agents to replace acetyl salicylic acid.

It is known that trans-dihydroxy-bis-hydroxycarbonylethylene (i.e. dihydroxy fumaric acid, hereinafter referred to as DH) has as much acetyl salicylic acid-like effects as acetyl salicylic acid and a little lower toxicity than acetyl salicylic acid [A. D'Amico et al.; Boll. Chim. Farm., vol. 101, pp. 903 et seq. (1962)]. As DH has a still rather high toxicity and various defects such as instability, especially at elevated temperature and at high humidity, and unpleasant sour taste, it has not been used in clinical fields.

It has now been found that novel salts of DH, i.e. the morpholine salt and piperazine salt, have stronger effects than DH without showing substantial toxicity.

The principal object of the present invention is to provide a morpholine salt or piperazine salt of DH which is useful as a strong atipyretic, analgesic and anti-inflammatory agent, with concomitant low toxicity. Another object of the present invention is to provide a medicinal composition comprising the morpholine salt or piperazine salt of DH which is stable against heat and humidity and which has acetyl salicylic acid-like effects such as antipyretic, analgesic and anti-inflammatory effects, but producing no untoward gastroenteric effects when administered orally.

The new salts of this invention are conveniently prepared by reacting DH with morpholine or piperazine. This reaction is conducted in a suitable solvent capable of dissolving DH, for example, water, acetone, lower alcohol or a mixture solvent of two or more of these, desirably under heating. Benzene, chloroform, etc. can also be used as the reaction solvent.

The objective compounds of this invention, generally, in case of reaction in organic solvent, separate out as crystals from the solvent. The crystals can be isolated by a per se conventional method, for example, filtration. In case of employing water as a solvent, the reaction mixture is concentrated to separate crystals, which are conveniently collected by means of filtration.

One of the characteristics of the new salts of this invention lies in their very low toxicity as shown by the following test.

TEST 1

Test was made for examining acute toxicity with respective samples:

(1) Dimorpholine salt of DH;
(2) Piperazine salt of DH;
(3) DH; and
(4) Acetyl salicylic acid.

Each sample was administered intraperitoneally or orally to groups each consisting of 6 mice (dd-strain, each weighing 15 to 17 g.). Thus administered mice were observed for 48 hours to calculate $LD_{50}$ by Litchfield-Wilcoxon method as shown in Table 1.

TABLE 1

| | $LD_{50}$ mg./kg. in mice | |
|---|---|---|
| Sample | Intraperitoneal (95%-CL) | Oral (95%-CL) |
| Salt of this invention: | | |
| (1) | 3,580 (3,420–3,720) | 8,900 (8,500–9,400) |
| (2) | 1,220 (1,030–1,440) | 7,000 (6,500–7,600) |
| Control: | | |
| (3) | 460 (390–550) | 1,580 (1,440–1,690) |
| (4) | 460 (370-440) | 890 (820–970) |

NOTE.—CL signifies "confidence limits."

Another characteristic of the salts of this invention lies in their effects as shown by the following test.

TEST 2

Test was made for examining analgesic effect of the same samples as used in Test 1.

The water solution of each sample was administered intraperitoneally or orally to groups each consisting of 10 mice of dd-strain, and analgesic activity was estimated by means of the Haffner method (each sample being administered together with the thershold amount, i.e. 0.0025 g./kg., of morphine hydrochloride) and the acetic acid stretching inhibiting method, and $ED_{50}$ was calculated by the Litchfield-Wilcoxon method. The results are shown as follows:

TABLE 2

| | $ED_{50}$ mg./kg. in mice (95%–CL) | |
|---|---|---|
| | Administration | |
| Sample | Intraperitoneal (Haffner Method) | Oral (Acetic acid stretching inhibiting method) |
| Salt of this invention: | | |
| (1) | 64 (51.7–79.4) | 190 (156–232) |
| (2) | 60 (43.8–82.3) | 175 (138–222) |
| Control: | | |
| (3) | 88 (67.7–114) | 320 (248–413) |
| (4) | 73 (60.0–89.0) | 195 (157–242) |

Moreover, the salts of this invention, unlike acetyl salicylic acid, engender no substantial side-effects such as gastroenteric disorders, as shown by the following clinical data.

Clinical data

Method: 16 patients, suffering from rheumatoid arthritis and complaining of gastroenteric troubles on administration of acetyl salicylic acid, were administered orally 2 capsules each containing 250 mg. of dimorpholine salt of DH three times a day for 4 weeks, in place of acetyl salicylic acid. The resulting effects were judged collectively by both subjective and objective symptoms in comparison with acetyl salicylic acid.

TABLE 3

| | Dimorpholine salt of DH 1,500 mg./day (oral) | | | | |
|---|---|---|---|---|---|
| | Analgesic effect | | | | |
| | More than acetyl salicylic acid | Same as acetyl salicylic acid | Less than acetyl salicylic acid | No effect | Gastroenteric disorder |
| Nos. of patients | 3 | 11 | 2 | 0 | 0 |

The new salts of the present invention have an excellent stability even at an elevated temperature and humidity as shown, for example, by the following test.

TEST 4

Test was made for examining changes in color and degrees of swelling as to respective samples:

(1) Dimorpholine salt of DH;
(2) Piperazine salt of DH; and
(3) DH (as a control).

A small amount of crystals of each sample was kept standing at 40° C. at a relative humidity of 83%, and the appearance of the sample was observed to give the results shown in Table 4 (changes in color) and in Table 5 (degrees of swelling).

TABLE 4.—CHANGES IN COLOR

| | Day | | | | |
|---|---|---|---|---|---|
| | 3 | 7 | 10 | 14 | 21 |
| Sample: | | | | | |
| (1) | − | − | − | − | − |
| (2) | − | − | − | − | − |
| (3) | + | ++ | ++ | +++ | +++ |

NOTE:
− no change.
+ slight change.
++ fair change.
+++ remarkable change.

TABLE 5.—DEGREES OF SWELLING

| | Day | | | | |
|---|---|---|---|---|---|
| | 3 | 7 | 10 | 14 | 21 |
| Sample: | | | | | |
| (1) | − | − | − | − | − |
| (2) | − | − | − | − | − |
| (3) | + | ++ | ++ | +++ | +++ |

NOTE:
− no change.
+ slight change.
++ fair change.
+++ remarkable change.

The new salts of the present invention did not change in their appearance even after 21 days' standing, while the free acid, DH as the control, started to change in appearance after only 3 days' standing and changed remarkably after 14 days.

The salts of this invention are useful as antipyretic, analgesic and anti-inflammatory agents and are generally administered orally, parenterally or topically in the form of capsule, syrup, oil, injection, ointment, tablet, etc. Pharmaceutical compositions containing one or more of the salts of this invention can be prepared according to any per se conventional means for the preparation of capsules, syrups, oil, injections, etc.

In the various aforesaid administration forms, the active ingredient can be present in a minor proportion relative to a major proportion of carrier. However, the reverse relationship is also possible, i.e. a minor proportion of carrier is employed in association with a major proportion of active ingredient. Examples of administrations are shown below.

A typical effective daily dose of the salts of this invention for a human adult is usually about 500 mg. to 3 g., desirably 1000 mg. to 2 g., although an increased or reduced daily dose is also effective depending on the symtoms of the inflammation being treated, the indicated dose being especially suitable against inflammation caused e.g. by rheumatic fever.

It is to be understood that the following examples are solely for the purpose of illustration and are not intended to be construed as limitations of this invention, and that minor variations may be resorted to without departing from the spirit and scope of the invention. In the said examples "g.," "ml." and "mg." stand for "gram(s)," "milliliter(s)," and "milligram(s)," respectively.

Temperatures are all uncorrected, and percentages are all on the weight basis.

EXAMPLE 1

To a solution of 300 g. of DH in 3.3 liters of ethanol, there was added dropwise 300 g. of morpholine under stirring and cooling with water. The stirring was continued for a further 30 minutes to complete the reaction. The reaction mixture was cooled to give white precipitates, which were separated by filtration from the mixture. The precipitates were washed with ethanol and dried to obtain dimorpholine salt of DH melting at 175° to 176° C. Yield 95.6%.

Elementary analysis.—$C_{12}H_{22}N_2O_8$—Calculated (percent): C, 44.69; H, 6.88; N, 8.69; Found (percent): C, 44.72; H, 6.70; N, 8.45.

The pH of an aqueous solution of one gram of the above objective compound in 50 milliliters of water is 6.39, while that of the starting material DH is 1.94 at the same concentration.

EXAMPLE 2

A solution of 5 g. of morpholine in 50 ml. of methanol was added dropwise to a suspension of 5 g. of DH in 500 ml. of water under agitation. The agitation was further continued for about one hour, until the reaction mixture became almost clear. After filtration, the filtrate was quickly concentrated under reduced pressure to separate crystals. To the concentrate was added 100 ml. of ethanol to accelerate separation of crystals. The crystals were collected by filtration, washed with ethanol, and dried to obtain 7.9 g. of dimorpholine salt of DH melting at 175° C. Yield 90%.

EXAMPLE 3

5 g. of DH was dissolved in 120 ml. of acetone under warming. To the solution there was added dropwise 5 g. of morpholine under agitation. After the manner described in Example 1, 8.4 g. of dimorpholine salt of DH melting at 175° to 176° C. was obtained.

EXAMPLE 4

5 g. of DH was dissolved in 250 ml. of ethyl acetate under warming. To the solution there was added dropwise 5 g. of morpholine under agitation. After the manner described in Example 1, 8.2 g. of dimorpholine salt of DH melting at 175° to 176° C. was obtained.

EXAMPLE 5

A solution of 9.0 g. of piperazine in 3.5 ml. of ethanol was added dropwise into a solution of 14.8 g. of DH in 160 ml. of ethanol under ice-cooling and agitation. After the manner described in Example 1, 20.4 g. of piperazine salt of DH melting at 200° to 220° C. (decomposition) was obtained.

Elementary analysis.—$C_{14}H_{26}N_2O_6$—Calculated (percent): C, 52.83; H, 8.23; N, 8.80. Found (percent): C, 52.98; H, 8.13; N, 8.84.

As indicated hereinbefore, the new salts of this invention can be administered in a variety of composition form, some examples of which are as follows:

COMPOSITION 1

|  | Mg. per tablet |
|---|---|
| (1) Dimorpholine salt of DH | 250 |
| (2) Microcrystalline cellulose | 142 |
| (3) Calcium salt of carboxymethylcellulose | 20 |
| (4) Lactose | 78 |
| (5) Talc | 15 |
| (6) Magnesium stearate | 3 |
| (7) Hydroxypropyl methylcellulose | 41.892 |
| (8) Ethylcellulose | 12.761 |
| (9) Titanium dioxide | 2.347 |
|  | 575.000 |

(1), one-half quantity of (2), and (4) were kneaded with methanol solution of chloromethylene, and the mixture dried under reduced pressure, then granulated. Remaining half of (2), (3), (5) and (6) were added to the granules and compressed into tablets. Thus-prepared tablets may further be coated with e.g. sugar.

The piperazine salt of DH can be replaced by the corresponding quantity of dimorpholine salt of DH.

COMPOSITION 2

|  | Mg. per g. of powder |
|---|---|
| Dimorpholine salt of DH | 200 |
| Lactose | 600 |
| Starch | 200 |
|  | 1000 |

All ingredients were thoroughly mixed, the resultant admixture then serving as an "oral powder."

COMPOSITION 3

|  | Mg. per capsule |
|---|---|
| Dimorpholine salt of DH | 250 |
| Gelatin capsule | 55 |
|  | 305 |

Pulverized dimorpholine salt of DH was filled into the gelatin capsule.

What is claimed is:

1. Amine salt of trans-dihydroxy-bis-hydroxycarbonylethylene, the amine being selected from the group consisting of morpholine and piperazine.

2. A compound according to claim 1, namely, the dimorpholine salt of trans-dihydroxy-bis-hydroxycarbonylethylene.

3. A compound according to claim 1, namely, the piperazine salt of trans-dihydroxy-bis-hydroxycarbonylethylene.

References Cited

UNITED STATES PATENTS 3,180,867  5/1965  Shapiro et al. _____ 260—268

ALEX MAZEL, Primary Examiner

A. M. T. TIGHE, Assistant Examiner

U.S. Cl. X.R.

260—268; 424—230, 248, 250